United States Patent Office 3,547,688
Patented Dec. 15, 1970

3,547,688
MICROBIOCIDAL COMPLEXES OF AZIRIDIN-
YL COMPOUNDS AND BIOCIDAL METAL
SALTS AND THEIR USE IN RENDERING
TEXTILES OR OTHER SUBSTRATES DUR-
ABLY MICROBIOCIDAL
Domenick Donald Gagliardi, East Greenwich, and Vir-
ginia S. Kenney, North Kingstown, R.I., assignors to
Gagliardi Research Corporation, East Greenwich, R.I.,
a corporation of Rhode Island
No Drawing. Filed Jan. 4, 1967, Ser. No. 607,137
Int. Cl. D06m 13/44, 13/48, 13/54
U.S. Cl. 117—138.5                           13 Claims

ABSTRACT OF THE DISCLOSURE

Microbiocidal compositions are prepared by complexing water-soluble biocidal metal salts with aziridinyl compounds to form solutions containing aziridinyl metal adducts.

Substrates subject to biological attack, e.g., textiles, paper, wood, leather, certain plastics, etc., are wet with such compositions, dried and then heated, e.g., 100–170° C., to set the metal complex on the substrate and provide the substrate with durable microbiocidal effects, e.g., bacteriocidal, fungicidal, rot-proof or self-sanitizing properties.

BACKGROUND OF THE INVENTION

Many forms of chemical products have been devised, some of which are commercially available, to be used to treat fabrics, leather, paper, wood or other solid substrates to impart microbiocidal effects to the substrates. For example, chemical treatments have been used to prepare so-called "sanitized" fabrics which have the ability to kill microorganisms which come into contact with the fabrics. Treated fabrics of this type are particularly useful in hospitals but also find the utility in the manufacture of garments in order to prevent odor formation in the garments, skin rashes of persons contacting the fabric, spread of toxic organisms by contact with contaminated garments and the like. Microbiocidal chemical products are also widely used for so-called "rot-proofing" effects to protect fabrics or other solid substrates against attack by fungus, mildew and the like. This invention concerns new forms of chemical products which can produce bacteriostatic, bacteriocidal, mildew-proofing, rot-proofing, sanitizing and other desirable effects upon solid substrates, which properties may be generically referred to as "microbiocidal effects."

Among the prominent known microbiocidal compounds that have been used to treat solid substrates are:

phenyl mercuric acetate
copper 8-quinolinolate
tributyl tin oxide
pentachlorophenol and other chlorophenols
tribromosalicylanilide
trichlorocarbanilide
silver ethylene thiourea nitrate
zinc dimethyl dithiocarbamate
quaternary ammonium salts
organolead compounds
zinc dithiopyridine oxide
neomycin and other antibiotics.

Some of these compositions have only mildew-proofing properties. Others are only effective against gram-negative or gram-positive organisms. Some are highly toxic to warm blooded animals. Some have noxious odors. Several decompose on exposure to light and heat while others are very expensive.

A single important fault exists with all such agents, especially when applied to textile materials. Thus, while the agents may produce initial microbiocidal effects on fabrics, these effects are removed by high temperature alkaline washings, as with built synthetic detergents. Some of these materials are even removed by simple cold water leaching or by outdoor weathering. Others lose their activity when they come in contact with soaps and detergents. This is especially true with the cationic quaternary ammonium compounds which form insoluble and biologically inactive precipitates by double decomposition with anionic surfactants.

It is well known in the bacteriological and medical fields that many water-soluble heavy metal salts have varying degrees of microbiocidal activity in in-vitro tests on various organisms. Such water-soluble heavy metal salts include, among others: mercury, lead, silver, zinc, copper, aluminum, zirconium, nickel, tin, chromium, titanium, iron, cobalt, manganese, and alums. Some of these water-soluble metal salts have broad range bacteriostatic, bacteriocidal, fungistatic or fungicidal properties. Others have only limited effects. (See chapter 13 by A. J. Salle on pp. 308–318 of the book "Antiseptics and Disinfectants, Fungicides and Sterilization" edited by C. F. Reddish, 2nd ed., May 1961, published by Lea & Febiger, Philadelphia, Pa.) While such heavy metal salts may be used to treat fibrous and related materials, their practical utility is nil, since their water solubility makes them easily removable by leaching, weathering or laundering operations.

Complex salts of silver with amido compounds have been used to produce antibacterial textile fabrics (U.S. 3,061,469 and 3,085,909). Complex water-soluble salts formed from zirconyl acetate and borates of nickel, copper or mercury have also been used (U.S. 3,183,118). Insoluble silver thiocyanate precipitated in situ on an article has also been used (U.S. 2,981,640). Zirconium salts, complexed with biocidal halogenated phenols have been employed to make cellulosic textiles rot resistant (U.S. 3,183,149). Metal salts of antibiotics, e.g., zinc bactracin, copper neomycin, etc., have been used for the protection of textiles against noxious organisms (U.S. 3,116,207).

It is known that durability of finishing effects on textiles and other substrates can be improved by creating a chemical bondage between an applied chemical reagent and the substrate. This type of operation has been used to obtain a combined antibacterial finish along with wrinkle resistance in cellulosic fabrics by the application of germicidal mercurated allyl-s-triazines to textiles (U.S. 3,252,751).

Aziridinyl compounds are known to be reactive to active hydrogen materials and accordingly, this class of chemical compound has been extensively investigated and employed for this purpose. It has been disclosed, for example, that aziridinyl compounds may be used without added reagents to impart special effects such as crease resistance to cotton textiles (U.S. 3,038,776 and 3,205,034) or as a means to fix pigments or other reagents upon fiber substrates (U.S. 3,266,931).

Notwithstanding the great variety of biocidal chemical compositions which have been tested for creating microbiocidal effects in solid substrates, there exists a need for improved compositions and methods for imparting such effects to fabrics and other substrates. In particular, there is a need for compositions and methods of providing broad spectrum microbiocidal activity in fabrics and other substrates which is durable even to repeated high temperature alkaline washes and which will be effective against gram-negative and gram-positive organisms, fungi and rot.

OBJECTS

A principal object of the invention is the provision of improvements in microbiocidal effects on textiles, paper, wood, leather, plastics and other substrates.

Further objects include the provision or attainment of the following:

(1) New biocidal metal complexes that may be effectively set upon solid substrates to impart durable microbiocidal effects.

(2) New forms of durable self-sanitizing fabrics.

(3) Fabrics extremely improved in rot-proof properties.

(4) New concepts for creating broad spectrum bacteriocidal and fungicidal properties in fabrics, paper, leather and other substrates that require such protection.

(5) New methods of rendering textiles microbiocidal which are fully compatible with many other established fabric finishing procedures, e.g., crease-proofing, dyeing, soil-repelling, etc.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

These objects are accomplished according to the present invention by the provision of microbiocidal products formed by combining in an aqueous medium a water-soluble biocidal metal salt and an aziridinyl compound having a molecular weight of at least 110 to form a water-soluble complex of the aziridinyl compound and the biocidal metal. The term "water soluble" is used in this specification and the accompanying claims means a solubility at ambient temperature, e.g., about 25° C., of at least 1 gram per liter of water.

The new water-soluble complexes of aziridinyl compounds and water-soluble biocidal metal salts, typified by the adduct of trisaziridinyl phosphine oxide and zirconyl acetate, have broad spectrum microbiocidal activity including effectiveness against gram negative and gram positive organisms and fungi. The aziridinyl compounds per se from which the water-soluble complexes are formed do not have this microbiocidal activity. Also, in contrast to the water-soluble heavy metal salts of which the complexes are formed, the new compositions are substantive to cotton fabrics and other substrates so that when so applied, they are durable against laundering or the like. The heavy metal water-soluble salts per se do not have this property and the utility of the salts themselves in rendering substrates microbiocidal is practically nil since their water-solubility makes them easily removable by leaching, weathering or laundering operations.

The contrast in properties between the aziridinyl compounds and the water-soluble heavy metal salts of which the new compositions are formed demonstrates that these metal complexes are not simply physical mixtures of the two separate reagents. The exact chemical structure of the new products has not been definitely established, but it appears that they can be represented by the following general formula:

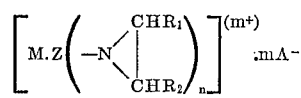

where:

M is a biocidal metal cation,
$m$ is a positive charge or valence from 1 to 4,
$n$ is an integer from 1–6,
A is a mono or polyvalent anion,
Z is an organic or inorganic nucleus,
$R_1$ and $R_2$ are hydrogen or hydrocarbon radicals, particularly those containing 1 to 8 carbon atoms.

The new metal complexes when prepared can be used to treat textile, paper, wood, leather, plastics and the like to impart microbiocidal effects. Advantageously, the treatment of the substrate for this purpose is by wetting the substrate with an aqueous solution of the new metal complexes followed by drying and heating at an elevated temperature, for example, 100–170° C., to set the metal complex on the substrate. Wetting of the substrate with the aqueous solution can be effected by dipping, padding, or other established impregnating procedures although other methods of application such as spraying, electrostatic coating or the like are contemplated for use in carrying out the new operation.

EXAMPLES

The following report of details of operation and resulting data illustrate further the principles and practice of the invention to those skilled in the art. In these examples and throughout the remaining specification and claims, all parts and percentages are by weight and all temperatures are in degrees C. unless otherwise specified.

Example 1

Samples of bleached cotton print cloth were padded through aqueous solutions containing 2.5% tris aziridinyl phosphine oxide and three different mol equivalent concentrations of various heavy metal salts. After padding, drying 5'/250° F., and curing 5'/300° F., the treated fabrics were tested for inhibition of Staph. aureus by the AATCC 90–1965T test. The tests were repeated after one, two and three accelerated AATCC No. IIA wash tests. The results are shown in Table I. In all cases 0.5% of fluoboric acid salt was used as a catalyst. It can be seen that the untreated fabric and that treated only with APO (aziridinyl phosphine oxide) produced no inhibition at all. Various degrees of inhibition were found with the metal salt complexes.

TABLE I

| Percent APO* in bath | Mol equivalent of salt | Relative inhibition | | | |
|---|---|---|---|---|---|
| | | Init. | 1 wash | 2 wash | 3 wash |
| None | None | U | U | U | U |
| 2.5 | do | U | U | U | U |
| 2.5 | 1 copper acetate | E (3.0) | E (3.0) | E (6.0) | E (2.0) |
| 2.5 | 1 nickel acetate | G | E (2.0) | E (1.0) | E (1.0) |
| 2.5 | 1 zinc nitrate | E (0.5) | E (2.0) | E (1.5) | E (1.5) |
| 2.5 | 2 copper acetate | E (1.5) | E (2.0) | E (2.0) | E (0.0) |
| 2.5 | 2 nickel acetate | E (3.0) | E (4.0) | E (3.0) | E (2.0) |
| 2.5 | 2 zinc nitrate | E (2.0) | E (3.0) | E (1.5) | E (1.5) |
| 2.5 | 2 zirconyl acetate | E (1.0) | E (3.0) | E (3.5) | E (2.0) |
| 2.5 | 3 copper acetate | E (3.0) | E (3.0) | E (2.0) | E (2.0) |
| 2.5 | 3 nickel acetate | E (2.5) | E (2.0) | E (2.0) | E (2.0) |
| 2.5 | 3 zinc nitrate | E (2.0) | E (2.0) | E (2.0) | E (1.0) |
| 2.5 | 3 zirconyl acetate | E (1.0) | E (1.0) | E (2.0) | E (1.0) |
| 2.5 | 1 zirconyl nitrate | F (0.0) | | | |
| 2.5 | 2 zirconyl nitrate | E (0.5) | | | |
| 2.5 | 3 zirconyl nitrate | E (1.5) | | | |
| 2.5 | 0.004 silver nitrate | E (1.0) | E (2.0) | | |
| 2.5 | 0.031 silver nitrate | E (1.5) | E (0.0) | | |

*0.5% $Zn(BF_4)_2$ as catalyst.

EXAMPLE 2

Samples of cotton print cloth treated as those in Example 1 were given one, five and ten machine washings at 140° F. using an automatic home washer and a built synthetic detergent. After the washings, they were tested again for inhibition of Staph. aureus. The results are shown in Table II for a ratio of 1.5 mol equivalents of salt for each 2.5% solids APO present in the treating bath, applied by padding, drying and curing as before.

TABLE II

| APO/salt complex | Relative inhibition | | | |
|---|---|---|---|---|
| | Init. | 1 wash | 5 washes | 10 washes |
| Untreated | U | | | |
| APO only | U | | | |
| APO plus catalyst | U | | | |
| APO/copper acetate | E (3.0) | E (3.5) | E (3.5) | E (2.0) |
| APO/nickel acetate | E (2.5) | E (2.0) | E (1.5) | E (0.5) |
| APO/zinc nitrate | E (2.0) | E (2.0) | E (1.5) | E (0.5) |
| APO/zirconyl nitrate | E (1.0) | E (1.5) | E (1.5) | E 1.0) |
| APO/silver nitrate | E (4.0) | E (4.0) | E (3.5) | E (2.5) |
| APO/cobalt nitrate | E (8.0) | E (4.0) | | |
| APO/cobalt chloride zinc | E (5.0) | E (4.0) | | |
| APO/silicofluoride | E (2.0) | E (1.0) | E (0.0) | E (0.0) |
| APO/tin acetate | E (1.0) | E (0.0) | | |
| APO/manganese acetate | E (1.0) | G (0.0) | G (0.0) | F (0.0) |

EXAMPLE 3

Samples of cotton fabrics treated as in Example 1 were tested for mildew resistance by the two weeks soil burial procedure. The results of percent tensile strength retained are reported in Table III. These data show that cotton fabrics treated with the APO/heavy metal salt complexes are rendered durably mildew resistant showing in many cases full retention of strength. None of the so treated samples showed any surface growth of microorganisms.

TABLE III

| APO/metal complex[1] | Tensile strength[2] |
|---|---|
| Untreated fabric | 0 |
| APO alone | 0 |
| APO plus catalyst | 0 |
| APO/1 copper acetate | 115 |
| APO/2 copper acetate | 105 |
| APO/3 copper acetate | 113 |
| APO/1 nickel acetate | 105 |
| APO/2 nickel acetate | 102 |
| APO/3 nickel acetate | 100 |
| APO/1 zinc nitrate | 100 |
| APO/2 zinc nitrate | 91 |
| APO/3 zinc nitrate | 96 |
| APO/1 zirconyl acetate | 10 |
| APO/2 zirconyl acetate | 123 |
| APO/3 zirconyl acetate | 96 |

[1] 1 to 3 mol equivalents of metal salt as indicated.
[2] Percent retained two weeks burial.

EXAMPLE 4

While the two weeks soil burial test is considered satisfactory if 90–100% of fabric strength is retained, further tests were made on heavy (12 oz.) cotton duck material which was leached after treatment and then exposed in the soil burial test for up to 56 days. The results are shown in Table IV. The duck fabric was padded, dried 10'/250° F. and cured 10'/320° F. The actual percents of APO and heavy metal salts in the treating bath are shown. It can be seen that several of the heavy metal salt complexes even pass the 56 days soil burial test.

TABLE IV

| Percent APO* in bath | Percent metal salt in bath | Percent strength retained | | |
|---|---|---|---|---|
| | | 14 days | 28 days | 56 days |
| 2.16 | 2.8% copper acetate | 100 | 0 | 0 |
| 2.16 | 4.2% copper acetate | 97 | 94 | 76 |
| 4.32 | 5.6% copper acetate | 97 | 100 | 91 |
| 4.32 | 8.4% copper acetate | 100 | 95 | 100 |
| 4.32 | 6.4% zinc nitrate | 100 | 100 | 100 |
| 4.32 | 0.7% zinc acetate | 100 | 100 | 100 |
| 4.32 | 0.66% zirconyl acetate | 100 | 0 | 0 |
| 4.32 | 0.63% aluminum acetate | 100 | 0 | 0 |
| 4.32 | 1.00% silver nitrate | 100 | 100 | 100 |

* 0.5% $Zn(BF_4)_2$ catalyst.

Example 5

The antibacterial activity of cotton fabrics treated as in Example 1 with different empirical ratios of APO (2.5%) and metal salts was tested with both a gram positive and a gram negative organism (*Stap. aureus* and *E. coli*, respectively). The durability to 10 home launderings was also evaluated. The results are shown in Table V. The antibacterial activity shown by the treated cloth against both toxic organisms (before and after washing) establishes the durability property of aziridinyl-heavy salt treated fabrics.

TABLE V.—RELATIVE INHIBITION

| Percent metal[1] in APO bath | S. aureus | | E. coli | |
|---|---|---|---|---|
| | Initial | 10 washes | Initial | 10 washes |
| 0.89% copper | E (4.0) | E (0.5) | E (2.0) | E (0.0) |
| 3.37% copper | E (3.0) | E (2.0) | E (1.5) | E (0.5) |
| 0.85% nickel | E (2.0) | E (0.0) | E (2.5) | E (1.5) |
| 1.25% nickel | E (2.5) | E (0.5) | E (2.0) | E (1.0) |
| 0.70% zinc | E (0.5) | E (0.5) | E (1.0) | E (1.0) |
| 1.05% zinc | E (2.0) | E (0.5) | E (1.5) | E (1.0) |
| 0.66% zirconium | E (0.5) | E (0.5) | E (1.0) | E (0.5) |
| 0.99% zirconium | E (0.5) | E (1.0) | E (0.5) | E (1.0) |

[1] Percent metal, not metal salt.

Example 6

Samples of the cotton fabrics treated as in Example 1 were subjected to the modified CCC-T-191b—5760.1 mildew resistance test using a mixed culture of four fungi. After two weeks incubation, none of the APO/heavy metal salts treated samples showed any mildew growth or discoloration.

TABLE VI.—RELATIVE INHIBITION

| Treating bath | Initial rating | AATCC #2A wash tests | | |
|---|---|---|---|---|
| | | One | Two | Three |
| MAPS alone | U | U | U | U |
| MAPS/NiAc | E (1.0) | E (0.5) | E (0.0) | F (0.0) |
| MAPS/ZnAc | E (0.0) | G (0.0) | G (0.0) | F (0.0) |
| MAPO alone | U | U | U | U |
| MAPO NiAc | E (1.0) | E (0.1) | G (0.0) | F (0.0) |
| MAPO ZnAc | E (0.0) | G (0.0) | E (1.5) | G (0.0) |

Example 7

Treating solutions containing 2.5% of methyl aziridinyl phosphine sulfide (MAPS) and methyl aziridinyl phosphine oxide (MAPO) were prepared with 4.4% several heavy metal salts. These were applied to cotton print cloth by padding, drying 5'/250° F. and curing for 5ı/300° F. The results of agar plates tests were *Staph. aureus* are shown in Table VI. The two aziridinyl compounds alone showed little or no activity. With nickel or zinc acetate complexes, they were very effective even after the accelerated washes.

Example 8

Samples of cotton fabrics treated with the APO/$Zn(NO_3)_2$ 1:3 complex as in Example 1 were subjected to the AATCC 100–1965T test method to see if the fabric had germicidal properties. The following bacteria count was made after elution of the samples.

| Time—hrs.: | Number of bacteria |
|---|---|
| 0 | 20,250,000 |
| 3 | 13,900 |
| 6 | 363 |
| 24 | 0 |

These results show materials treated with aziridinyl/heavy metal salts complexes acquire significant germicidal properties.

Example 9

Solutions were prepared to contain the 1:1 zinc acetate complex (at 3% solids) of the following aziridinyl compounds:

N-octadecyl ethylene imine
Tris aziridinyl triazine
Hexakis (aziridinyl) phosphotriazine These solutions were used to treat pieces of kraft paper, wool flannel cloth, calfskin leather, wood tongue depressor, a nylon/cotton fabric, and a rainwear polyester/cotton blend. After padding, the samples were dried for 15 minutes at 220° F. They were then leached in running water for 24 hours and dried. Then the specimens were tested for mildew resistance by the CCC–T–191b—5760.1 method. After two weeks incubation, no growth was present in any of the specimens.

Example 10

A wash-and-wear resin finish containing:

| | Percent |
|---|---|
| Dimethylol urea resin | 15 |
| APO/zirconyl acetate 1:3 complex | 3 |
| Fluoroacrylate oil repellent | 3 |
| 2-methyl 2-amino propanol·HCl catalyst | 1 |
| Water | 78 | was applied to a viscose rayon fabric by padding, then curing for 5 minutes at 350° F. The initial fabric was highly wrinkle resistant, soil repellent and showed an E(3.0) rating by the agar plate test using *E. coli*. These properties were essentially maintained after 10 home launderings.

Example 11

Solutions were prepared to contain metal complexes of water-soluble metal salt and aziridinyl compound combinations are reported in the following Table VII:

TABLE VII

| A | B | C | D |
|---|---|---|---|
| (1) Tris-2-methyl aziridinyl phosphine oxide. | Zinc nitrate | 1:1 | 5 |
| (2) Tris-2-phenyl aziridinyl phosphine oxide. | Tin chloride | 1:0.6 | 2 |
| (3) 1,8-diaziridinyl perfluorooctane | Zirconyl acetate | 1:0.5 | 1 |
| (4) Carbonylbisaziridine | Silver nitrate | 1:1.0 | 0.1 |
| (5) 1,6-di(2-ethyl-3-methyl aziridinyl) hexane. | Phenyl mercuric acetate | 1:1 | 1.5 |
| (6) N-lauryl ethylene urea | Lead acetate | 1:0.2 | 3 |
| (7) Aziridinylmethyl betaaziridinyl propionate. | Cobalt chloride. | 1:0.5 | 2 |

In this table, the aziridinyl component of the metal complex is given in column A and the water-soluble salt in column B. The molar ratio of A to B is given in column C and the weight percentage of total solids in the aqueous solution is given in column D.

These solutions were used to treat samples of various materials as described in Example 9. All treated samples were found to possess an improved mildew resistance as comparable with untreated control samples and this microbiocidal protection was found to be durable against the water leaching. The equivalent concentrations of metal salts alone were found to give microbiocidal resistance to treated samples, but this was not resistant to the water leaching.

In the foregoing tables, there are reported some tensile strengths in excess of 100%. This is explained by the fact that shrinkage occurs in the treated fabrics as a result of the washing operations applied to the fabric samples. Accordingly, the washed fabric acquires a tensile strength in excess of the original control sample before washing.

By way of comparison with the results obtained as reported above, fabrics treated with water-soluble metal salts used in forming the aziridinyl complexes are incapable of providing durable microbiocidal effects to the fabric. Thus, although the water-soluble solts will give initial biocidal protection which could be rated as high as E(3.0), a single washing will eliminate this effect giving a result which would be reported as U.

EVALUATION TESTS

In order to assess the antimicrobial properties of the treated materials, the following standard test methods were used:

(1) AATCC 90–1965T using *Staph. aureus* or *E. coli*
(2) AATCC 100–1965T using *Staph. aureus*
(3) CCC–T–191b—5760.1 mixed mildew culture
(4) CCC–T–191b—5762 soil burial method.

The first method, generally referred to as the "agar plate" method, evaluated the efficiency of a treated material to inhibit the growth of the applied organism when cultured for 24 hours on an agar surface. This method measures the "halo" in millimeters formed around the test specimen. Secondly, it qualitatively can be used to assess the percent inhibition produced under the specimen. The following ratings are used.

| Rating: | Percent inhibition |
|---|---|
| E (excellent) | 100 |
| G (good) | 75 |
| F (fair) | 50 |
| P (poor) | 25 |
| U (unsatisfactory) | 0 |

For example, a rating of E(3.0) means excellent inhibition of the growth of the microorganism under the specimen and a 3.0 mm. zone of inhibition around the specimen. A rating of E(0.0) means no visible halo, but complete inhibition under the specimen. The agar plate test is performed on the material after treatment and after multiple high temperature washings using either the AATCC #2A wash test or practical home automatic machine washing employing built synthetic detergent.

The second method establishes whether the treated substrate has bacteriostatic or bacteriocidal properties and also measures the efficiency of the bacteriocidal action produced.

The third method is used to assess the inhibition of growth of four mildews on the surface of the treated material by observing the presence or absence of colored colonies of mildews thereon.

The fourth method involves burying the samples of material in an especially prepared fertile soil and observing the rotting and loss in tensile strength produced by 2, 4, 6, etc. weeks of soil burial.

Further description of the various test methods may be found in the 1965 Technical Manual of the American Association of Textile Chemists and Colorists and in Federal Specifications CCC–T–191b.

DISCUSSION OF DETAILS

The formation of heavy metal salt complexes as disclosed herein appears to be generally applicable to aziridinyl compounds having a molecular weight of at least 110. Such compounds can have a single aziridinyl group or a plurality. Typical examples of aziridinyl compounds advantageously used in forming the new metal complexes include:

Tris aziridinyl phosphine oxide

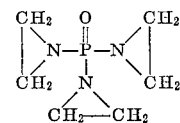

Tris aziridinyl phosphine sulfide

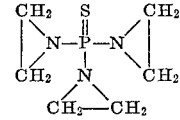

N-octadecyl ethylene imine

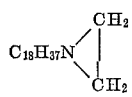

N-perfluorooctyl aziridine

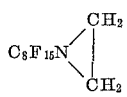

N-phenyl ethylene imine

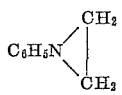

Tris aziridinyl triazine

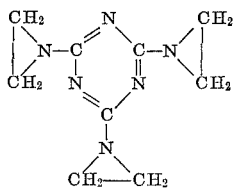

Carbonylbisaziridine

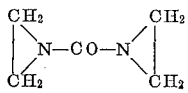

N-lauryl ethylene urea

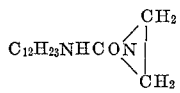

Bis aziridinyl oxamide

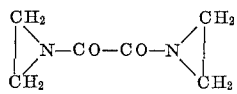

Hexakis (aziridinyl) phosphotriazine

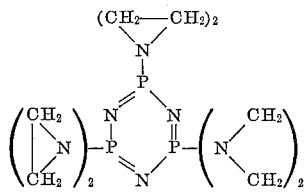

Tetrakis (aziridinyl) 1,4-benzoquinone

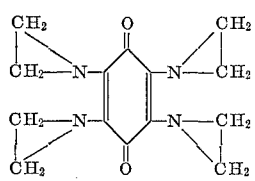

Additional examples of aziridinyl compounds are those in which the 2 or 3 or the 2 and 3 positions in any of the aziridinyl groups would be replaced by a $C_1$ to $C_8$ hydrocarbon radical, e.g., methyl, ethyl, butyl, isobutyl, amyl octyl, hexyl, cyclohexyl, cyclopentyl, phenyl, benzyl, tolyl, xylyl vinyl, allyl, or cyclopentadienyl groups. Alkyl radicals of 1 to 5 carbon atoms are preferred. Such substituted azridinyl compounds include:

tris-2-methyl aziridinyl phosphine oxide
2-methylaziridinyl-bis-aziridinyl phosphine sulfide
tris-2-phenylaziridinyl phosphine oxide
2,3-dioctyl aziridine
2-methyl-3-hexyl aziridine
2-methyl-N-dodecyl aziridine.

The above examples serve to illustrate typical aziridinyl compounds which can be used with biologically active heavy metal salts to produce durable anti microbial properties. It is not an object of this invention to utilize metal complexes of ethylene imine, propylene imine or other imine monomers since such monomers are very volatile, toxic gases or liquids and their metal adducts are hydrolytically unstable for use on textiles or related materials.

Typical water-soluble heavy metal salts useful for this invention are: zinc acetate, zirconium acetate, copper acetate, titanium tetrachloride, nickel acetate, tin acetate, zinc proprionate, mercuric chloride, manganese chloride, aluminum chlorhydroxide, aluminum potassium alum, cuprammonium hydroxide, silver ethylene thiourea nitrate, basic chromium chloride, phenyl mercuric acetate, zirconium nitrate, zinc sulfate, zirconium chlorhydroxide, copper chloride, chromium acetate, tin chloride, cobalt acetate, silver nitrate, lead acetate, cobalt chloride, iron chloride, zinc nitrate, copper sulfate, cadmium nitrate, zinc iodide, nickel sulfate, zinc silicofluoride. Other water-soluble heavy metal salts which have antimicrobial properties may be used with the aziridinyl compounds to produce a durable antimicrobial effect on solid substrates.

While it is possible to prepare pure crystalline forms of such aziridinyl-metal complexes, a preferred simple, and most economic procedure is to dissolve the aziridinyl compound in water or in water-solvent mixtures and then add a water solution of the heavy metal salt. The dissolved complex formed in situ is applied to textiles, paper, wood, etc., by padding, coating, spraying and the like, to deposit sufficient material to produce the desired degree of initial and durable antimicrobial effects.

Preparation of pure crystalline forms of the metal complexes calls for use of molecular proportions of the two critical reagents, e.g., 1, 2, 3, etc., moles of the metal salt per mole of aziridinyl compound. A slight excess, e.g., up to 1.5 mole metal salt per aziridinyl group may be employed. However, useable treating solutions can be prepared using less than equimolecular amounts of the metal salt, particularly with the more biocidally active metals. Useable treating solutions may be prepared with as little as 0.01 mol of metal salt per mol of aziridinyl compound. Advantageously, 0.1 to 1.2 mols of metal salt per aziridinyl group can be used. Excess of the aziridinyl compound above the molecular proportion of the metal salt probably exists as a mixture with the stoichiometric metal complex.

For durable mildew-proofing purposes, the total solids applied may range from 0.5–10%, depending on the nature of the aziridinyl compound and on the metal salt used. Complexes based on silver, mercury, tin, or lead may be used at 0.5–1.0% with good effect. Complexes based on zinc, zirconium, aluminum and cobalt may require 1–5% solids deposition. Measured in terms of the amount of metal per se applied and fixed to the substrate, effective microbiocidal effects can be obtained with metal content as low as 1 p.p.m. based on the weight of the substrate with the more biocidally active metals, e.g., silver and mercury. Advantageously, the metal content can be from about 0.001% to 1%, or even higher.

Depending on the nature of the fibrous or related material to be treated and on the particular complex used, the solids requirements for durable antibacterial activity may vary from 0.1–10%. In most cases, 0.5–5% of the complex will suffice depending on the degree of washability desired. Again, with selected silver and mercury compounds, amounts even as low as 0.1% of the complex may be used.

The formation of the metal aziridinyl-metal complexes is advantageously carried out in aqueous media, preferably water. However, use of water-miscible solvents alone or mixed with water may be used, e.g., alcohols such as ethyl and methyl alcohols, glycols such as ethylene glycol, propylene glycol, or equivalent materials.

Following the application of the aziridinyl-heavy metal salt complex to the substrate material, it is necessary to heat the same both to dry off the solvent and to set the complex on the fiber or related material. Generally, drying for 1–10 minutes at 100–170° C. is sufficient for fibrous materials, the time being inversely related to the temperature. Lower temperatures and longer times may also be used on heat sensitive materials.

CONCLUSION

The mechanism of formation of the aziridinyl-heavy metal complexes of the invention and their durable connection to substrates is not fully understood. It is surprising that the metal complexes are water-soluble and unexpected that they could be durably fixed to fabrics, leather, wood, and similar substrates.

The new products and methods have wide applicability in treatment of all types of products requiring protection against mildew, rotting, bacterial odor or attack and similar microbiological problems. Extensive utilization of the new products and methods in treatment of fabrics, particularly cellulosic fabrics, is possible. The combination of such treatments with other known fabric treatments is contemplated, e.g., moth-proofing, dyeing pigmenting, fire-proofing, water-proofing, soil-proofing, and the like.

The embodiments of the invention in which an exclusive property or right is claimed are defined as follows:

1. A water-soluble aziridinyl metal complex consisting essentially of a water-soluble biocidal metal salt and an aziridinyl compound having a molecular weight of at least 110, said metal complex having the formula:

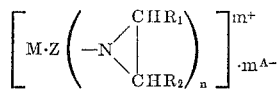

wherein:

M is a biocidal metal cation,
$m$ is a positive charge or valence from 1 to 4,
$n$ is an integer from 1 to 6,
A is a mono or polyvalent anion,
Z is an organic or inorganic nucleus,
$R_1$ and $R_2$ are hydrocarbon radicals or hydrogen.

2. A water-soluble aziridinyl metal complex consisting essentially of an aziridinyl compound having a molecular weight of at least 110 and 0.1 to 1.2 mols per aziridinyl group of said compound of a water-soluble biocidal metal salt.

3. A metal complex as claimed in claim 1 wherein $R_1$ and $R_2$ are hydrocarbon radicals of 1 to 8 carbon atoms.

4. A metal complex as claimed in claim 1 wherein Z is one of the radicals of the group phosphine oxide, phosphine sulfide, alkyl, perfluoroalkyl, aryl, triazinyl, carbonyl, alkyl carbamyl, and phosphotriazinyl.

5. A metal complex as claimed in claim 2 wherein said metal salt is an inorganic acid salt of mercury, lead, silver, zinc, copper, aluminum, zirconium, nickel, tin, chromium, cadmium, titanium, iron, cobalt and manganese.

6. A metal complex as claimed in claim 2 wherein the metal of said metal salt is from the group mercury, silver, zinc, copper, nickel and zirconium.

7. A metal complex as claimed in claim 2 wherein said metal salt is zirconyl acetate and said aziridinyl compound is trisaziridinyl phosphine oxide.

8. A metal complex as claimed in claim 2 wherein said metal salt is silver nitrate and said aziridinyl compound is N-perfluorooctyl aziridine.

9. A method of rendering a solid substrate subject to biological attack selected from the group consisting of textiles, paper, wood and leather durably microbiocidal which comprises:
   (A) applying to said substrate an aqueous solution of a water-soluble aziridinyl metal complex of an aziridinyl compound having a molecular weight of at least 110 and 0.1 to 1.2 mols per aziridinyl group of a water-soluble biocidal inorganic metal salt,
   (B) drying said substrate to leave a residue thereon of said metal complex, and
   (C) heating the dried substrate to a temperature between about 100–170° C. to set the metal complex on said substrate.

10. A method as claimed in claim 9 wherein said aziridinyl compound is selected from the group consisting of trisaziridinyl phosphine oxide, trisaziridinyl phosphine sulfide, N-octadecyl ethylene imine, N-perfluorooctyl aziridine, N-phenyl ethylene imine, trisaziridinyl triazine, carbonyl bisaziridine, N-lauryl ethylene urea, bisaziridinyl oxamide, hexakis (aziridinyl) 1,4-benzo-quinone and said metal salt is selected from the group of mercury, lead, silver, zinc, copper, aluminum, zirconium, nickel, tin, chromium, cadmium, titanium, iron, cobalt and manganese acetates, chlorides, nitrates, and sulfates.

11. A solid substrate selected from the group consisting of cellulosic textiles, paper, wood and leather having improved microbiocidal properties by the durable association thereon of an aziridinyl metal complex consisting essentially of an aziridinyl compound having a molecular weight of at least 110 and 0.1 to 1.2 mols per aziridinyl group of said compound of a water-soluble biocidal metal salt of an acid selected from the group consisting of inorganic acids and acetic acid.

12. A substrate as claimed in claim 11 comprising cotton fabric having set thereon between about 0.1 to 10% of said metal complex.

13. A substrate as claimed in claim 12 wherein said complex consists essentially of zinc acetate and trisaziridinyl phosphine oxide.

References Cited

UNITED STATES PATENTS

| | | | |
|---|---|---|---|
| 2,861,902 | 11/1958 | Pritchard | 117—138.5 |
| 2,891,877 | 6/1959 | Chance et al. | 117—136 |
| 3,038,776 | 6/1962 | Chance et al. | 117—139.4X |
| 3,061,469 | 10/1962 | Manowitz et al. | 117—138.5 |
| 3,085,909 | 4/1963 | Gagliardi et al. | 117—138.5 |
| 3,183,118 | 5/1965 | Conner | 117—138.5 |
| 3,183,149 | 5/1965 | Gonzales et al. | 117—138.5UX |
| 3,205,034 | 9/1965 | Chance | 117—139.4X |
| 3,252,751 | 5/1966 | Shaw et al. | 117—138.5X |
| 3,300,336 | 1/1967 | Gagliardi et al. | 117—138.5 |
| 3,394,027 | 7/1968 | Conner et al. | 117—138.5 |

WILLIAM D. MARTIN, Primary Examiner
T. G. DAVIS, Assistant Examiner

U.S. Cl. X.R.
117—142, 143, 144, 147, 154; 260—239

UNITED STATES PATENT OFFICE
CERTIFICATE OF CORRECTION

Patent No. 3,547,688                Dated    December 15, 1970

Inventor(s)   Domenick Donald Gagliardi et al.

It is certified that error appears in the above-identified patent and that said Letters Patent are hereby corrected as shown below:

In the heading to the printed specification, 8 to 10 "assignors to Gagliardi Research Corporation, East Greenwi R. I., a corporation of Rhode Island" should read -- assig by mesne assignments, to Sanitized, Inc., New York, N. Y., a corporation of New York --.

Signed and sealed this 11th day of May 1971.

(SEAL)
Attest:

EDWARD M. FLETCHER, JR.                    WILLIAM E. SCHUYLER, J
Attesting Officer                          Commissioner of Patent